United States Patent
Nishida et al.

(10) Patent No.: US 9,678,578 B2
(45) Date of Patent: Jun. 13, 2017

(54) DEVICE HAVING TOUCH PANEL, DISPLAY CONTROL PROGRAM AND DISPLAY CONTROL METHOD

(75) Inventors: Keita Nishida, Nishinomiya (JP); Hiroki Okubo, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 195 days.

(21) Appl. No.: 14/349,307

(22) PCT Filed: Oct. 3, 2011

(86) PCT No.: PCT/JP2011/005578
§ 371 (c)(1),
(2), (4) Date: Apr. 2, 2014

(87) PCT Pub. No.: WO2013/051048
PCT Pub. Date: Apr. 11, 2013

(65) Prior Publication Data
US 2014/0258935 A1  Sep. 11, 2014

(51) Int. Cl.
*G06F 3/02* (2006.01)
*G06F 3/038* (2013.01)
(Continued)

(52) U.S. Cl.
CPC ............ *G06F 3/0227* (2013.01); *G06F 3/038* (2013.01); *G06F 3/0362* (2013.01);
(Continued)

(58) Field of Classification Search
CPC .... G06F 3/0227; G06F 3/0416; G06F 3/0488; G06F 3/04883; G06F 3/04847;
(Continued)

(56) References Cited

U.S. PATENT DOCUMENTS

| | | | |
|---|---|---|---|
| 8,497,784 B1 * | 7/2013 | Vandrovec | B64D 43/00 340/945 |
| 2002/0126099 A1 * | 9/2002 | Engholm | G01R 13/20 345/173 |

(Continued)

FOREIGN PATENT DOCUMENTS

| | | |
|---|---|---|
| JP | 2004199555 A | 7/2004 |
| JP | 2008282390 A | 11/2008 |
| JP | 2010079868 A | 4/2010 |

OTHER PUBLICATIONS

ISA Japanese Patent Office, International Search Report of PCT/JP2011/005578, Dec. 27, 2011, WIPO, 1 page.

*Primary Examiner* — Jennifer To
*Assistant Examiner* — Liang Li
(74) *Attorney, Agent, or Firm* — Alleman Hall Creasman & Tuttle LLP

(57) ABSTRACT

A touch panel device includes a hardware key, a display unit, a detector, and a controller. The display unit displays an image on a display screen. The detector detects a position of a touch operation performed on the display screen. The controller performs setting-value change processing of changing a setting value of an object displayed at the touched position, when the hardware key is operated while the touch operation on the display screen is detected.

11 Claims, 10 Drawing Sheets

(51) Int. Cl.
   *G06F 3/0488*     (2013.01)
   *G06F 3/0362*     (2013.01)
   *G06F 3/0484*     (2013.01)
   *G06F 3/041*      (2006.01)

(52) U.S. Cl.
   CPC .......... *G06F 3/0416* (2013.01); *G06F 3/0488* (2013.01); *G06F 3/04847* (2013.01); *G06F 3/04883* (2013.01); *G06F 2203/0381* (2013.01); *G06F 2203/04803* (2013.01); *G06F 2203/04806* (2013.01); *G06F 2203/04808* (2013.01)

(58) Field of Classification Search
   CPC ................... G06F 3/038; G06F 3/0362; G06F 2203/0381; G06F 2203/04806; G06F 2203/04803; G06F 2203/04808; G06F 3/03–3/047
   See application file for complete search history.

(56) References Cited

U.S. PATENT DOCUMENTS

| | | | |
|---|---|---|---|
| 2010/0005419 A1 | 1/2010 | Miichi et al. | |
| 2010/0094132 A1* | 4/2010 | Hansen | A61B 8/462 600/443 |
| 2011/0007035 A1* | 1/2011 | Shai | G06F 3/014 345/179 |

* cited by examiner

DEVICE HAVING TOUCH PANEL, DISPLAY CONTROL PROGRAM AND DISPLAY CONTROL METHOD

TECHNICAL FIELD

The present invention mainly relates to a device having a touch panel, which includes a hardware key.

BACKGROUND ART

Conventionally, information display devices which are installed in ships and acquire information from ship instruments and display it have been known. Patent Document 1 discloses such an information display device.

With this kind of information display device, for example, when changing a setting value (e.g., when changing a scale), an operator needs to perform the following operations. That is, first, the operator operates a key or the like provided to the information display device to display a menu screen. Next, the operator displays a sub-menu screen when needed, and then selects a desired item (e.g., an item for changing the scale). Then, the operator can change the setting value by operating a cursor key, a rotary key or the like.

REFERENCE DOCUMENTS OF CONVENTIONAL ART

Patent Document(s)

Patent Document 1: JP2008-282390A

DISCLOSURE OF THE INVENTION

Problems to be Solved by the Invention

However, the above method is troublesome since it requires complicated operations. Moreover, the operator needs to know the operation of displaying the menu screen, the item to be selected to perform desired setting and the like, otherwise the operation cannot be performed smoothly and he/she gets confused. Therefore, the above method has a room for improvement in view of operability.

Moreover, in a case of using a touch panel device (a device having a touch panel) which can detect a touch operation, by having a configuration in which an operation by a touch gesture is possible, instinctive operation is easily achieved. On the other hand, in the case of using the touch gesture, since a positional offset and the like caused by a finger shaken or when separating the finger from the touch panel influence, there has been a case where it is difficult that the setting is changed accurately.

The present invention is made in view of the above situations and aims to provide a touch panel device which is excellent in operability and able to change setting accurately.

Summary and Effect(s) of the Invention

Problems to be solved by the present invention are described above, and means for solving the problems and effects thereof will be described below.

According to a first aspect of the invention, a device having a touch panel with the following configuration is provided. That is, the device having the touch panel includes a hardware key, a display unit, a detector, and a controller. The display unit is configured to display an image on a display screen. The detector is configured to detect a position of a touch operation performed on the display screen. The controller is configured to perform setting-value change processing of changing a setting value of an object displayed at the touched position, when the hardware key is operated while the touch operation on the display screen is detected.

Thus, an instinctive and simple operation by the touch operation can be achieved, while a fine change of the setting which is difficult by a touch operation can be performed by the hardware key. Moreover, a tactual feedback (e.g., clicking feeling) which is not easily to be obtained by a touch operation can be given to an operator. Moreover, in a case of performing changes or the like of the setting value continuously, for example, by performing the setting while one of hands remains on the hardware key and the other hand selects the object, the operation can be performed quickly.

With the above device having the touch panel, after the detector no longer detects the touch operation on the display screen, the controller is preferred not to perform the setting-value change processing even when the hardware key is operated.

Thus, the operator can easily switch the state of the display screen from a state of performing the setting-value change processing to a state of not performing the setting-value change processing by simply separating a finger or the like from the display screen.

With the above device having the touch panel, the controller may change a display mode of the object displayed at the touched position.

Thus, the operator can surely grasp the object of which the setting value is to be changed.

With the above device having the touch panel, it is preferred to have the following configuration. That is, the display unit displays a setting-value display box where the setting value is displayed. When the hardware key is operated while the touch operation on the setting-value display box is detected, the controller changes the setting value according to the operation of the hardware key.

Thus, the operator can change the setting value displayed in the setting-value display box with the instinctive and simple operation.

With the above device having the touch panel, it is preferred to have the following configuration. That is, the display unit displays a predetermined area indicating a predetermined range. When the hardware key is operated while the touch operation on the predetermined area is detected, the controller changes the predetermined area according to the operation of the hardware key.

Thus, the operator can change the predetermined area with the instinctive and simple operation.

With the above device having the touch panel, it is preferred to have the following configuration. That is, the display unit is able to display information in a divided screen mode in which the display screen is divided and different information is displayed in the respective divided screens. When the hardware key is operated while the touch operation on any of the divided screens is detected, the controller performs the setting-value change processing only on the touched divided screen.

Thus, the operator can specify the divided screen on which the setting-value change processing is to be performed and specify the object of which the setting value is to be changed, by simply touching one point on the display screen. Therefore, the work of the operator can be reduced.

With the above device having the touch panel, the setting-value change processing is preferred to be processing of changing a display mode of the image by having the touched position as a reference position.

Thus, the operator can specify the reference position in changing the display mode instinctively and quickly.

With the above device having the touch panel, the setting-value change processing is preferred to include zooming-in or zooming-out the image by having the touched position as a reference position.

Thus, the operator can specify the divided screen on which the zooming-in or zooming-out is to be performed and specify the reference position therein, by simply touching one point on the display screen. Therefore, the work of the operator can be reduced.

With the above device having the touch panel, the device is preferred to be installed in a ship, and information acquired from ship instrument is preferred to be displayed in the display unit.

Thus, the effects of the invention can be exerted with the device having the touch panel configured to display information acquired from the ship instrument.

According to a second aspect of the invention, a display control program having the following configuration is provided. That is, the display control program causes a computer to display an image on a display screen, detect a position of a touch operation performed on the display screen, and perform setting-value change processing of changing a setting value of an object displayed at the touched position, when the hardware key is operated while the touch operation on the display screen is detected.

Thus, an instinctive and simple operation by the touch operation can be achieved, while a fine specification and the like of a value which is difficult by a touch operation can be performed.

According to a third aspect of the invention, the following display control method is provided. That is, the display control method includes displaying an image on a display screen, detecting a position of a touch operation performed on the display screen, and performing setting-value change processing of changing a setting value of an object displayed at the touched position, when the hardware key is operated while the touch operation on the display screen is detected.

Thus, an instinctive and simple operation by the touch operation can be achieved, while a fine specification and the like of a value which is difficult by a touch operation can be performed.

MODE(S) FOR CARRYING OUT THE INVENTION

Figure 1:
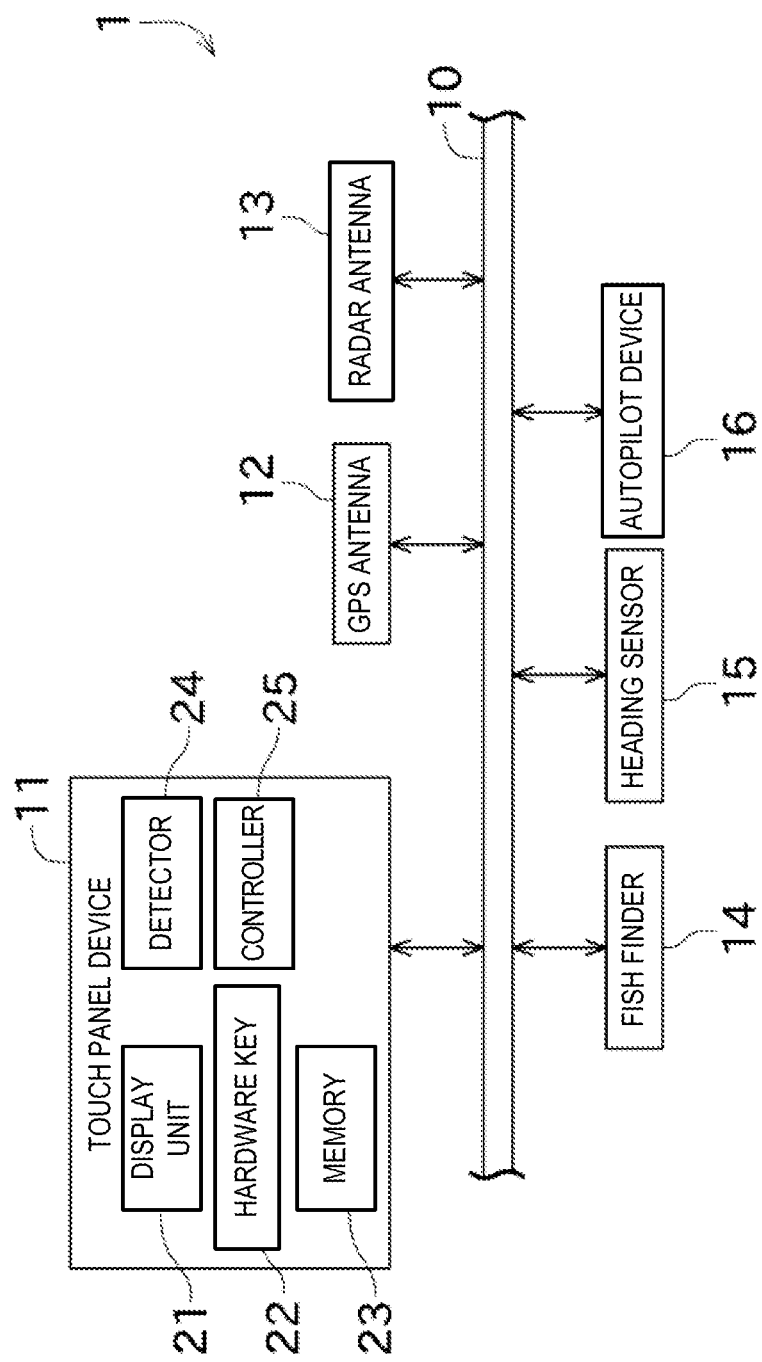
FIG. 1 is a block diagram illustrating an overall configuration of a ship instrument network system.
Figure 2:
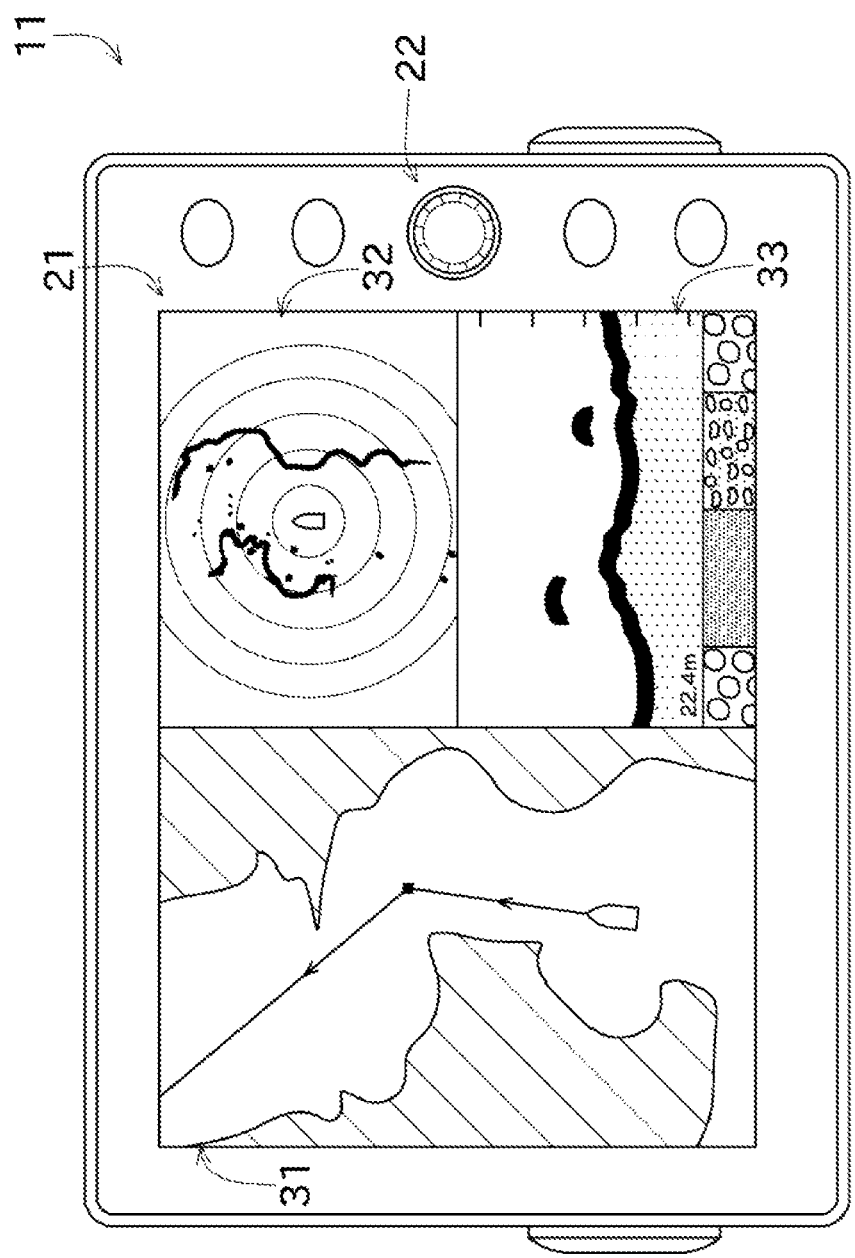
FIG. 2 is a front view of a touch panel device.

Next, one embodiment of the present invention is described with reference to the drawings. FIG. 1 is a block diagram illustrating an overall configuration of a ship instrument network system 1. FIG. 2 is a front view of a touch panel device 11.

The ship instrument network system 1 of this embodiment includes a plurality of ship instruments connected to a ship network 10. The ship instruments can exchange, for example, detected information via the ship network 10 with each other. As the standard of the ship network 10, LAN (Local Area Network) and CAN (Controller Area Network) can be adopted, for example.

As illustrated in FIG. 1, the ship instrument network system 1 of this embodiment includes a device having a touch panel (hereinafter, simply be referred to as the touch panel device) 11, a GPS antenna (GNSS sensor) 12, a radar antenna 13, a fish finder (acoustic sensor) 14, a heading sensor 15, and an autopilot device 16.

The touch panel device 11 is configured to create and display an image (sensor image) based on information detected by the other ship instruments (sensors), detect a touch operation on a display screen, and perform processing according to the detection result. Specifically, the touch panel device 11 includes a display unit 21, a hardware key 22, a memory 23, a detector 24, and a controller 25.

The display unit 21 is comprised of, for example, a liquid crystal display, and can display the sensor image, various setting screens and the like on the display screen as described above.

The hardware key 22 is comprised of a rotary key to which a clockwise or counterclockwise rotational operation can be performed, and a menu key for calling out a menu screen, etc. Note that, with the touch panel device 11, input and instruction by a touch operation on the display screen can be performed. Therefore, the number of keys of the hardware key 22 can be reduced.

The memory 23 stores, for example, contents of program(s) to be executed by the controller 25, nautical chart information, and navigation route(s) set by an operator.

The detector 24 detects the touch operation performed on the display screen by the operator. In this embodiment, a projected capacitance system is used as a system for detecting the touch operation. This system is configured such that a plurality of electrodes with high transparency are disposed on a display panel and a touched position is detected based on a change of an electric capacity of each electrode caused when a fingertip approaches the panel. With this configuration, not only the touched position but also a finger motion in a touching state (shifting of the touched position) can be detected. Moreover, when two or more positions are touched simultaneously, the detector 24 can also detect the respective touched positions and shifting of the respective touched positions. The touched position(s) and the shifting of the touched position(s) detected by the detector 24 are outputted to the controller 25. Note that, the system for detecting the touch operation is not limited to the projected capacitance system, and any other suitable system may be adopted. Moreover, other than the touch operation by a finger, a configuration in which a touch operation by a tapered stick-like member is detected may be adopted, for example.

The controller 25 creates the sensor image (a radar image, a nautical chart around the ship, etc.) based on stored contents in the memory 23 and information received from other ship instrument(s), and displays it on the display unit 21. The controller 25 receives information from a plurality of ship instruments and creates a plurality of sensor images. The controller 25 can switch a screen mode between a mode for displaying only one of the plurality of sensor images on the display screen (full screen mode) and a mode for dividing the display screen and displaying a plurality of sensor images thereon (divided screen mode, see FIG. 2).

Moreover, the controller 25 performs matching the shifting of the touched position detected by the detector 24 among predetermined touch operation contents (touch gestures), and thereby, identifies which touch gesture is performed by the operator. Then, the controller 25 performs processing corresponding to the identified touch gesture.

One specific example of the touch gestures includes a "drag operation." The drag operation is a touch gesture of moving a touching finger on the display screen (normally one finger) to a predetermined direction without separating it from the display screen. Scrolling of the image is normally associated with this drag operation. Note that, the drag operation also includes an operation of quickly moving the finger while touching the display screen (flick operation), and the like. Moreover, another example of the touch gestures includes a "pinch operation." The pinch operation is an operation of, without separating two touching fingers from the display screen, bringing the fingers close to each other (pinch in) or separating them from each other (pinch out). Processing of changing a scale of the image (processing of zooming in and zooming out) is normally associated with this pinch operation. Note that, the controller 25 can also identify other various touch gestures than the examples given above.

The GPS antenna 12 receives positioning signals from GPS satellites (GNSS satellites) and outputs them to, for example, the touch panel device 11 via the ship network 10. The controller 25 of the touch panel device 11 obtains a location of the ship (specifically, a location of the GPS antenna and a terrestrial reference absolute position) based on the positioning signals. Note that, a configuration in which the calculation for obtaining the location based on the positioning signals is performed on the GPS antenna 12 side and the ship location is outputted to the touch panel device 11 may be adopted.

The touch panel device 11 can exert a function as a navigation device based on the obtained ship location and the nautical chart information stored in the memory 23. Specifically, based on the acquired ship location and the nautical chart information stored in the memory 23, the controller 25 can superimpose the ship location on the nautical chart and display it on the display unit 21. Moreover, the controller 25 can obtain a ground speed and a trace of the ship by utilizing ship locations changed with time, and display them on the display unit 21. Further, the controller 25 can create a navigation route and display it on the display unit 21 based on the operator's selecting of a destination and a waypoint (stopover point) with the touch operation (see a first sensor image 31 illustrated in FIG. 2).

The radar antenna 13 transmits a microwave and receives a reflection wave from an object. The reflection wave is suitably signal-processed and then outputted to the touch panel device 11. The touch panel device 11 creates a radar image based on the reflection wave. Specifically, the controller 25 of the touch panel device 11 obtains a distance of the object based on a time length from the transmission of the microwave to the reception of the reflection wave. Moreover, the controller 25 obtains a direction in which the object exists, based on a direction to which the microwave is transmitted. The controller 25 creates the radar image as described above and displays it on the display unit 21 (see a second sensor image 32 illustrated in FIG. 2).

The fish finder 14 is comprised of a transducer and an analyzer. The transducer is installed in, for example, the bottom of the ship, and discharges an ultrasonic wave directly below into the sea and receives the reflection wave from the sea bottom or a school of fish. The analyzer creates fish finding data (data acquired by the fish finder and data of the school of fish or the sea bottom) based on the reflection wave. Moreover, the fish finder 14 of this embodiment has a function to determine a state of the sea bottom (bottom sediment type) based on the acquired fish finding data. Specifically, the analyzer can determine which kind the sea bottom falls in with more possibility, among rocks, gravel (stones), sand, and mud, by analyzing the received reflection wave. The fish finding data and the determined bottom sediment type are outputted to the touch panel device 11. Then, the controller 25 of the touch panel device 11 creates a third sensor image 33 based on the received data (see FIG. 2) and displays it on the display unit 21. In the third sensor image 33, the vertical axis indicates the fish finding data and the horizontal axis indicates a timing at which the fish finding data is acquired (the data is older as it goes toward the left end of the display screen).

The heading azimuth 15 is configured to detect a heading of the ship (a direction to which a bow of the ship is heading) by a terrestrial reference absolute position. Generally, a ship travels forward, toward its bow direction. Therefore, it can be said that the heading sensor 15 detects an azimuth of the forward direction of the hull of the ship. For example, a magnetic azimuth sensor or a GPS compass may be used as the heading sensor 15.

The autopilot device 16 is a device for automatically controlling a rudder so that the ship travels along the set navigation route. Specifically, the autopilot device 16 obtains how much the bow of the ship is to be changed based on the heading acquired from the heading sensor 15 and the navigation route acquired from the touch panel device 11. Then, the autopilot device 16 matches the course of the ship with the navigation route by changing an angle of the rudder according to the obtained value.

The ship instrument network system 1 of this embodiment is configured as described above. Note that, the ship instruments constituting the ship instrument network system 1 are arbitrary, and a configuration in which ship instrument(s) other than those described above are connected, or a configuration in which a plurality of similar types of ship instruments are connected may be adopted. Moreover, a configuration in which the processing of the data acquired by the ship instruments is performed by the ship instrument concerned may be adopted, or a configuration in which the processing of the data acquired by the ship instruments is performed by the controller 25 of the touch panel device 11 may be adopted.

Figure 3:
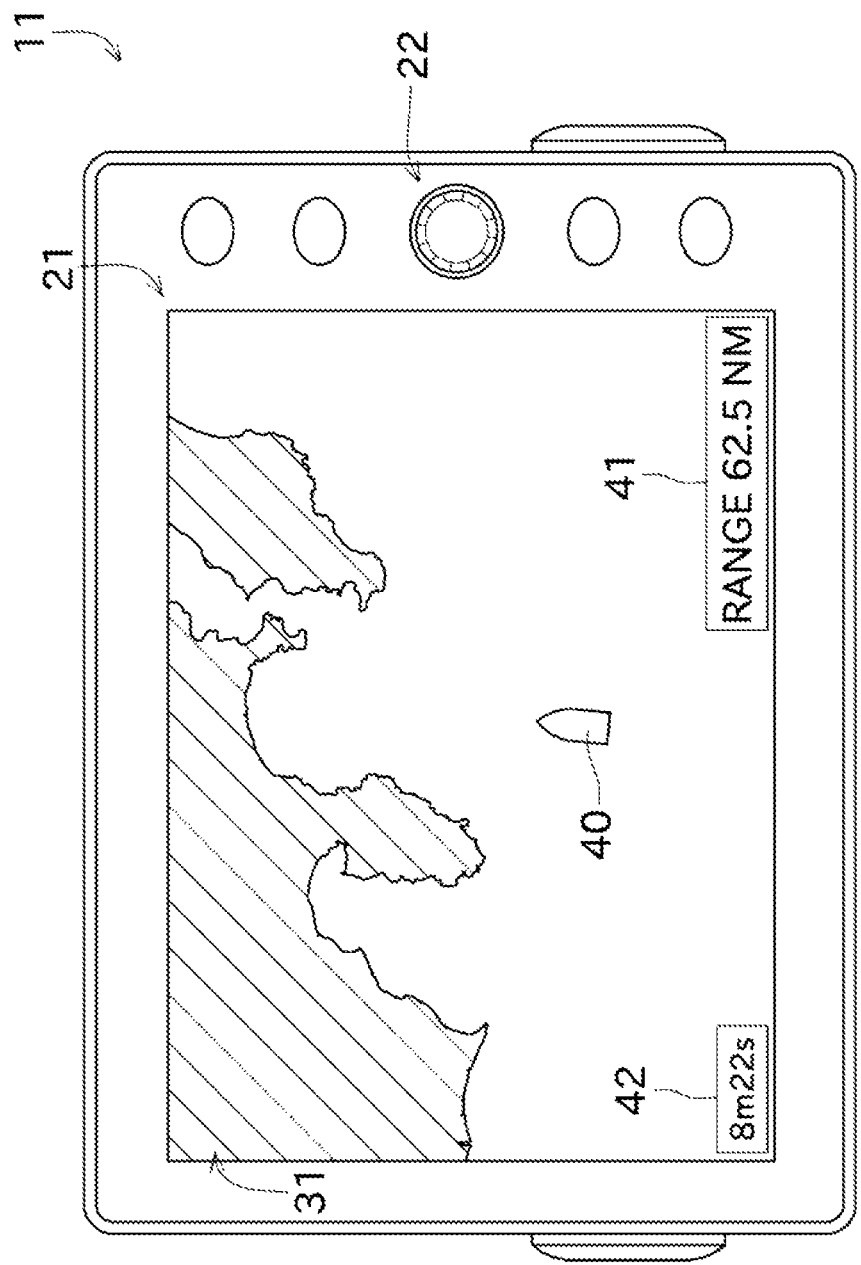
FIG. 3 is a view illustrating a first sensor image before changing a scale.
Figure 4:
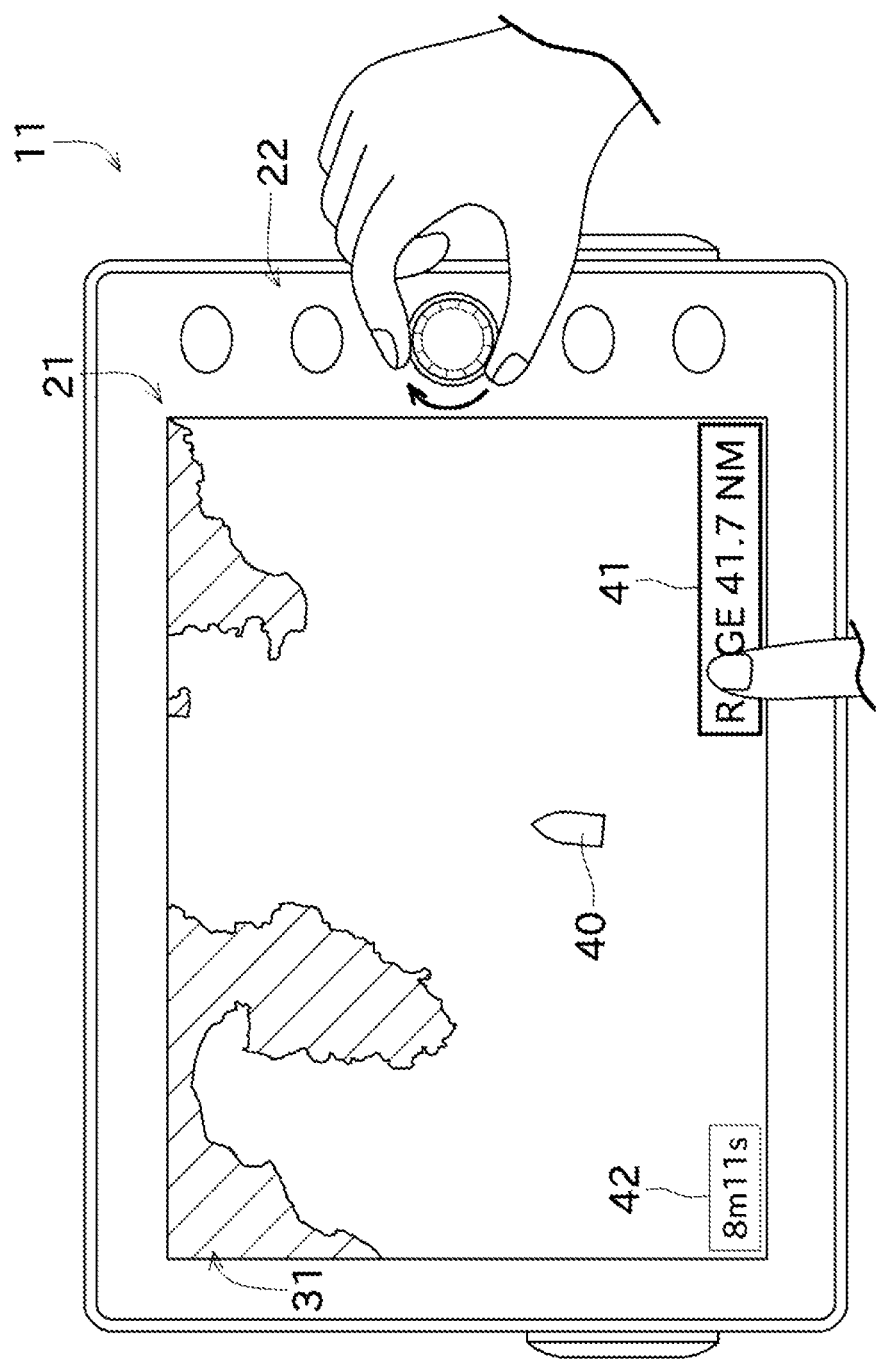
FIG. 4 is a view illustrating the first sensor image after changing the scale.

Next, an operation performed by the operator and processing performed by the controller 25 when changing the setting of each sensor image are described. First, a case of changing the scale (range) of the first sensor image 31 is described with reference to FIGS. 3 and 4. FIGS. 3 to 4 are views illustrating the first sensor image 31 before and after the scale change.

FIG. 3 is displayed with a ship mark 40, a range display box (setting-value display box) 41, and a timer display box (setting-value display box) 42. The ship mark 40 indicates the location of the ship. The range display box 41 is displayed in the right-bottom corner of the first sensor image 31. In the range display box 41, a value indicating the range (a display range, for example, a distance from the upper end to the lower end on the nautical chart) of the first sensor image 31 is displayed in a shape surrounded by a rectangular frame. The timer display box 42 is displayed in the left-bottom corner of the first sensor image 31. In the timer display box 42, a value indicating a time length left before a notification sound is rung is displayed surrounded by a rectangular frame.

The operator can change the scale of the first sensor image 31, for example, by rotating the hardware key 22 (the rotary key to be specific) while touching the frame of (or inside) the range display box 41 (see FIG. 4).

Hereinafter, processing performed by the controller 25 when the operator performs the operation described above is described. Since the controller 25 acquires the touched position based on the detection result from the detector 24, it can recognize that the range display box 41 is touched. When the controller 25 recognizes that the range display box 41 is touched, it displays the frame of the range display box 41 thicker (see FIG. 4). In this manner, the controller 25 can notify the operator that the scale is changeable.

Then, when the hardware key 22 is operated while the touch operation on the range display box 41 is detected, the controller 25 performs the processing of changing the scale (setting value) of the range display box 41 (setting-value change processing).

Thus, the scale can be changed finely compared to the case of changing the scale by the pinch operation. Moreover, in a case where the hardware key 22 is configured as a physical key from which a tactual feedback can be obtained, the operator can operate while following the sense of his/her hand. Therefore, the operator can easily perform the operation as he/she intends. As such a physical key, the rotary key with which clicking feeling can be obtained every predetermined angle of rotation, a push button key with which clicking feeling can be obtained by pushing, and the like can be considered. Further, since the hand of the side of touching the display screen only needs to keep the state of touching the right-bottom corner of the display screen, it can be such that the display screen is less likely to be covered by hand compared to the case of changing the scale by the pinch operation.

Moreover, the controller 25 is configured to accept the operation of changing the scale only while the touch operation on the range display box 41 is detected. Therefore, when the controller 25 no longer detect the touch operation on the range display box 41, it performs processing of returning the frame of the range display box 41 back to the normal thickness.

Thus, since the operation to end accepting the change of the scale is not required, the operator can instantly perform, for example, an operation of changing the different setting value. For example, in a case of changing the time length left before the notification sound is rung after the scale is changed, the time length left can be changed by, for example, only switching the position which the left hand touches from the range display box 41 to the timer display box 42 without moving the position of the right hand from the rotary key and rotating the hardware key 22 (the rotary key to be specific) with the right hand. In this embodiment, as described above, a quick operation becomes possible when a plurality of setting values are desired to be changed sequentially.

Figure 5:
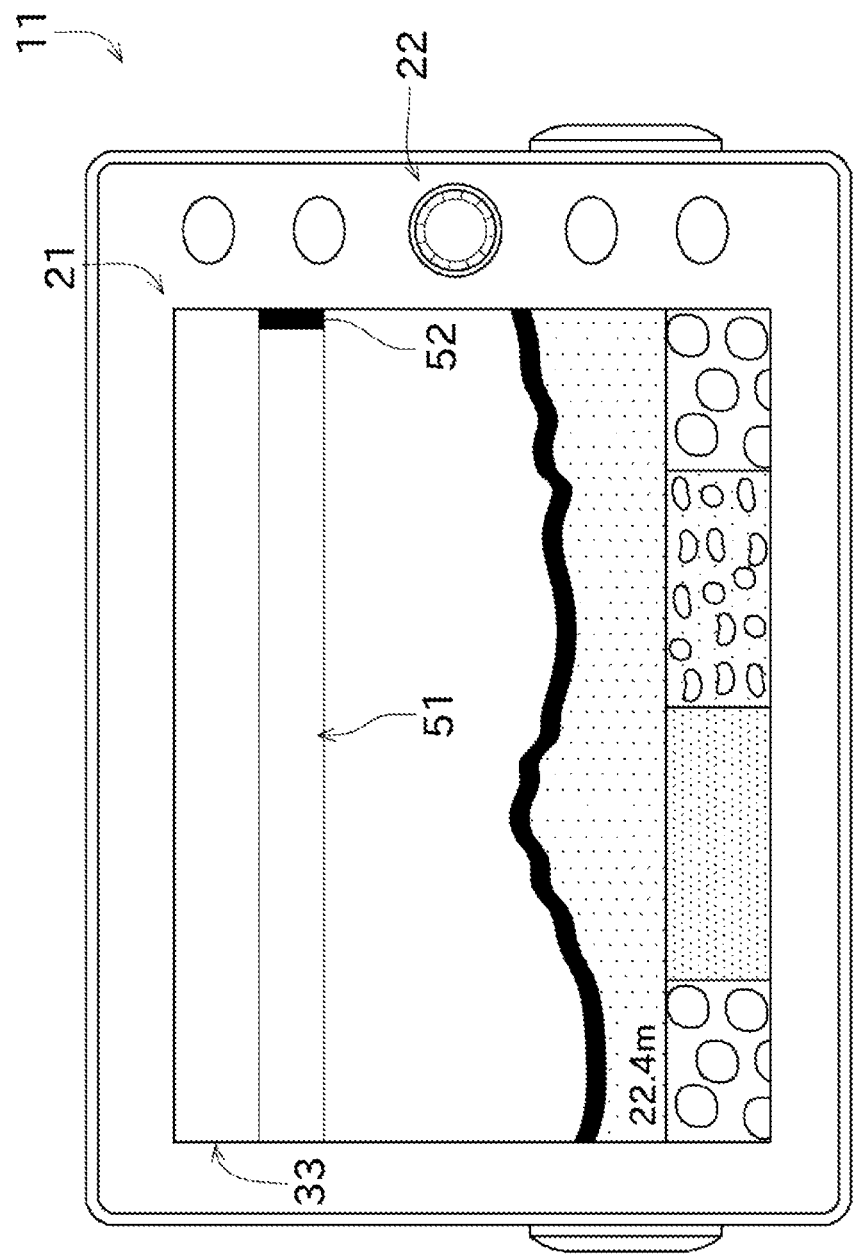
FIG. 5 is a view illustrating a third sensor image before changing a notification area.
Figure 6:
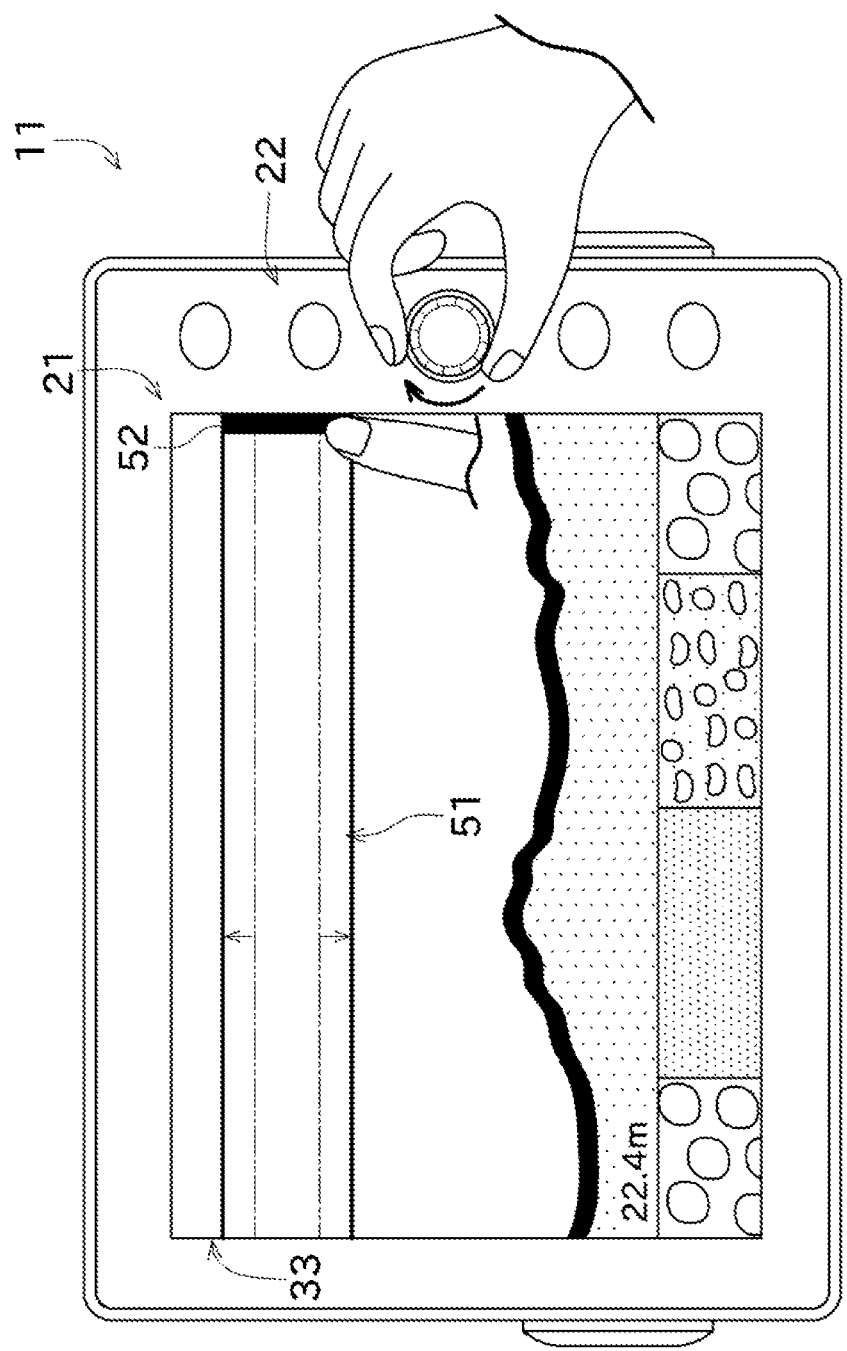
FIG. 6 is a view illustrating the third sensor image after changing the notification area.

Next, with a school-of-fish alarming function of the third sensor image 33, a case of changing a notification area is described with reference to FIGS. 5 and 6. FIGS. 5 and 6 are views illustrating the third sensor image 33 before and after the notification area is changed.

The school-of-fish alarming function is a function to, when an echo is obtained from a water depth within a predetermined range, notify that a school of fish is detected to the operator by using the notification sound or the like. FIG. 5 is displayed with a notification area (predetermined area) 51 and an alarm section 52. The notification area 51 is between a line indicating an upper limit value of depth and a line indicating a lower limit value of depth. The alarm section 52 is a graphic displayed at the right end of the notification area 51. The alarm section 52 is displayed only in a case where the school-of-fish alarm function is valid.

The operator can change the notification area 51 by rotating the hardware key 22 (the rotary key to be specific) while touching the alarm section 52.

Hereinafter, processing performed by the controller 25 when the operator performs the operation described above is described. Since the controller 25 acquires the touched position based on the detection result from the detector 24, it can recognize that the alarm section 52 is touched by the operator. When the controller 25 recognizes that the alarm section 52 is touched by the operator, it displays the lines indicating the upper and lower limit values of the notification area 51 thicker (see FIG. 6). In this manner, the controller 25 can notify the operator that the notification area 51 is changeable.

Then, when the rotary key is operated while the touch operation on the alarm section 52 is detected, as illustrated in FIG. 6, the controller 25 performs the processing (setting-value change processing) of changing the notification area 51 (the setting value indicating the water depth to be specific). Also in the case of changing the notification area 51, similarly to the description above, fine adjustment is possible, and the effect that the display screen is less likely to be covered by hand can be achieved. Note that, the controller 25 is, similarly to the description above, configured to accept the operation of changing the notification area 51 only while the touch operation on the alarm section 52 is detected.

Figure 7:
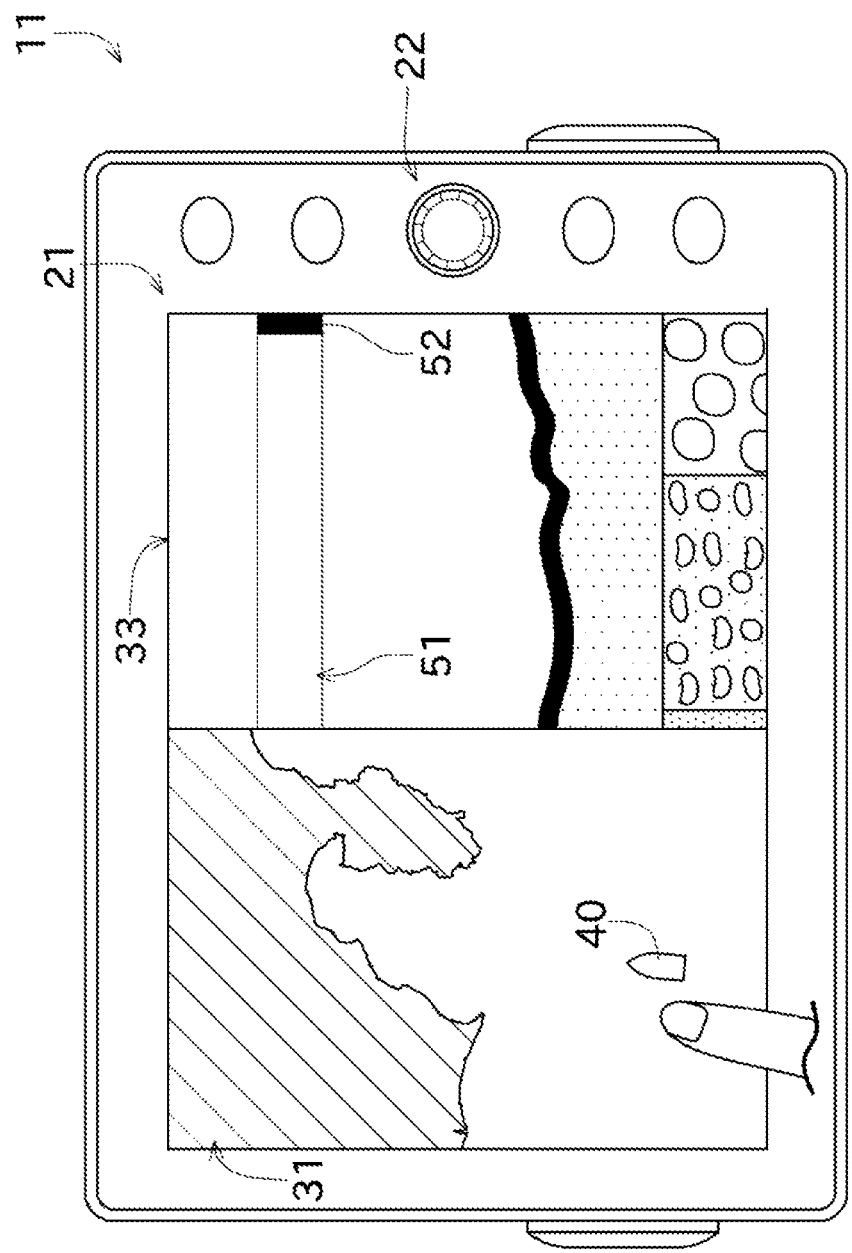
FIG. 7 is a view illustrating how a touch operation is performed on the first sensor image during a divided screen mode.
Figure 8:
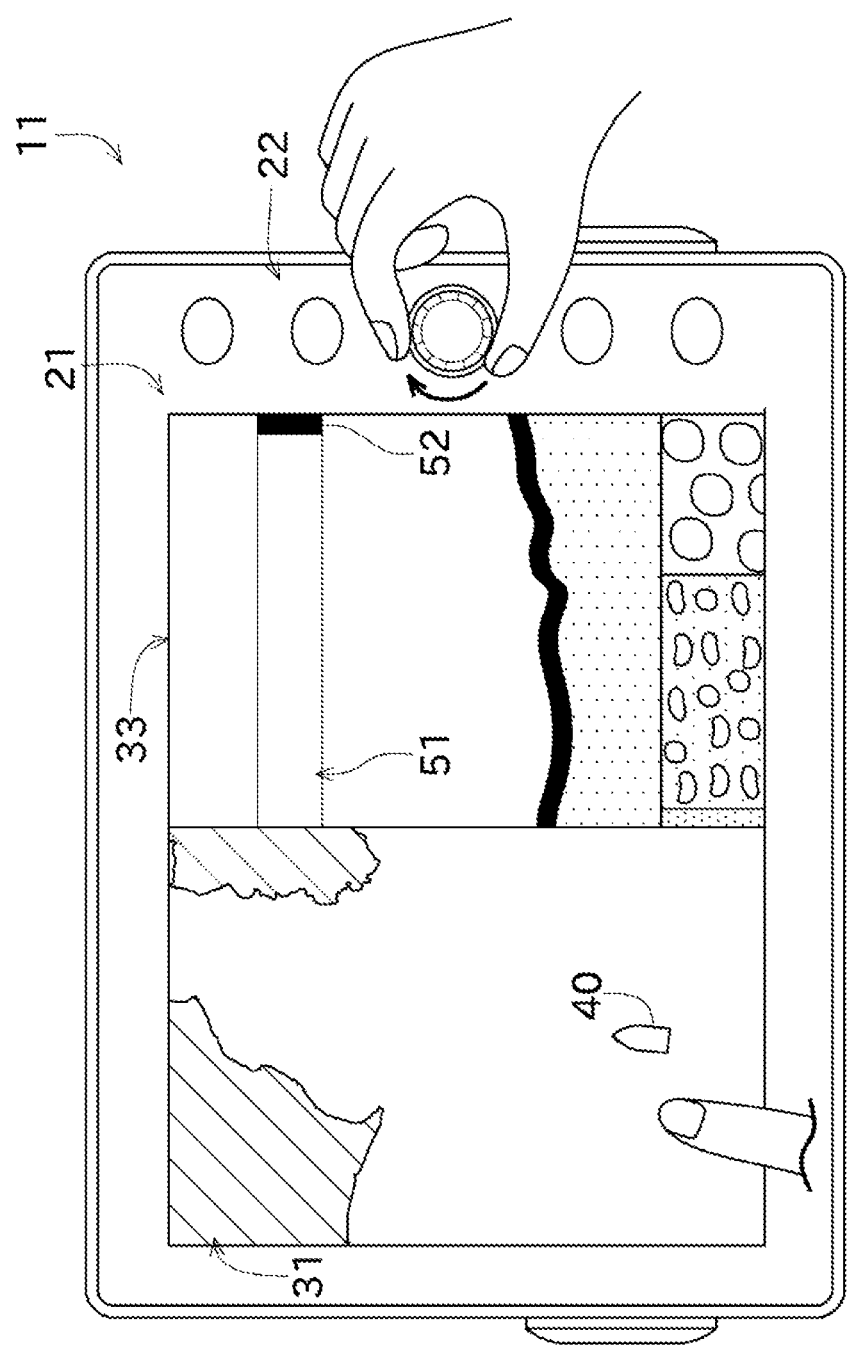
FIG. 8 is a view illustrating a state where the scale of the first sensor image is changed during the divided screen mode.

Next, in the divided screen mode, a case of changing the display mode of the image, specifically, a case of enlarging the first sensor image 31 is described with reference to FIGS. 7 and 8. FIGS. 7 and 8 are views illustrating the display screen before and after the first sensor image 31 is enlarged in the divided screen mode.

FIG. 7 is displayed with the display screen in which the first sensor image 31 is displayed in a left divided screen, and the third sensor image 33 is displayed in a right divided screen. Moreover, in the first sensor image 31 in the divided screen mode, the range display box 41 is normally not displayed so as to effectively utilize the display area.

The operator can perform the processing (setting-value change processing) of changing the scale (setting value) of the first sensor image 31 centering on the touched position (reference position) by touching a predetermined point of the first sensor image 31 (see FIG. 7) and rotating the hardware key 22 (the rotary key to be specific) (see FIG. 8). Note that, here, only the scale of the first sensor image 31 is changed and the scale of the third sensor image 33 is not changed.

Therefore, for example, even while referring to the information by scrolling the third sensor image 33, by simply rotating the hardware key 22 (the rotary key to be specific)

with the right hand while touching the first sensor image 31 with the left hand, the scale of the first sensor image 31 can be changed. Therefore, since the operation of specifying the divided screen where the operation is to be performed, and the operation of specifying the reference position of the scale can be performed at the same time, a quick operation can be achieved.

As described above, the touch panel device 11 of this embodiment includes the hardware key 22, the display unit 21, the detector 24, and the controller 25. The display unit 21 displays the image on the display screen. The detector 24 detects the position touched in the touch operation performed on the display screen. The controller 25 performs the setting-value change processing when the hardware key 22 is operated while the touch operation on the display screen is detected.

Thus, for example, specifying a fine value which is difficult with a touch operation can be performed while achieving an instinctive and simple operation by the touch operation.

Figure 9:
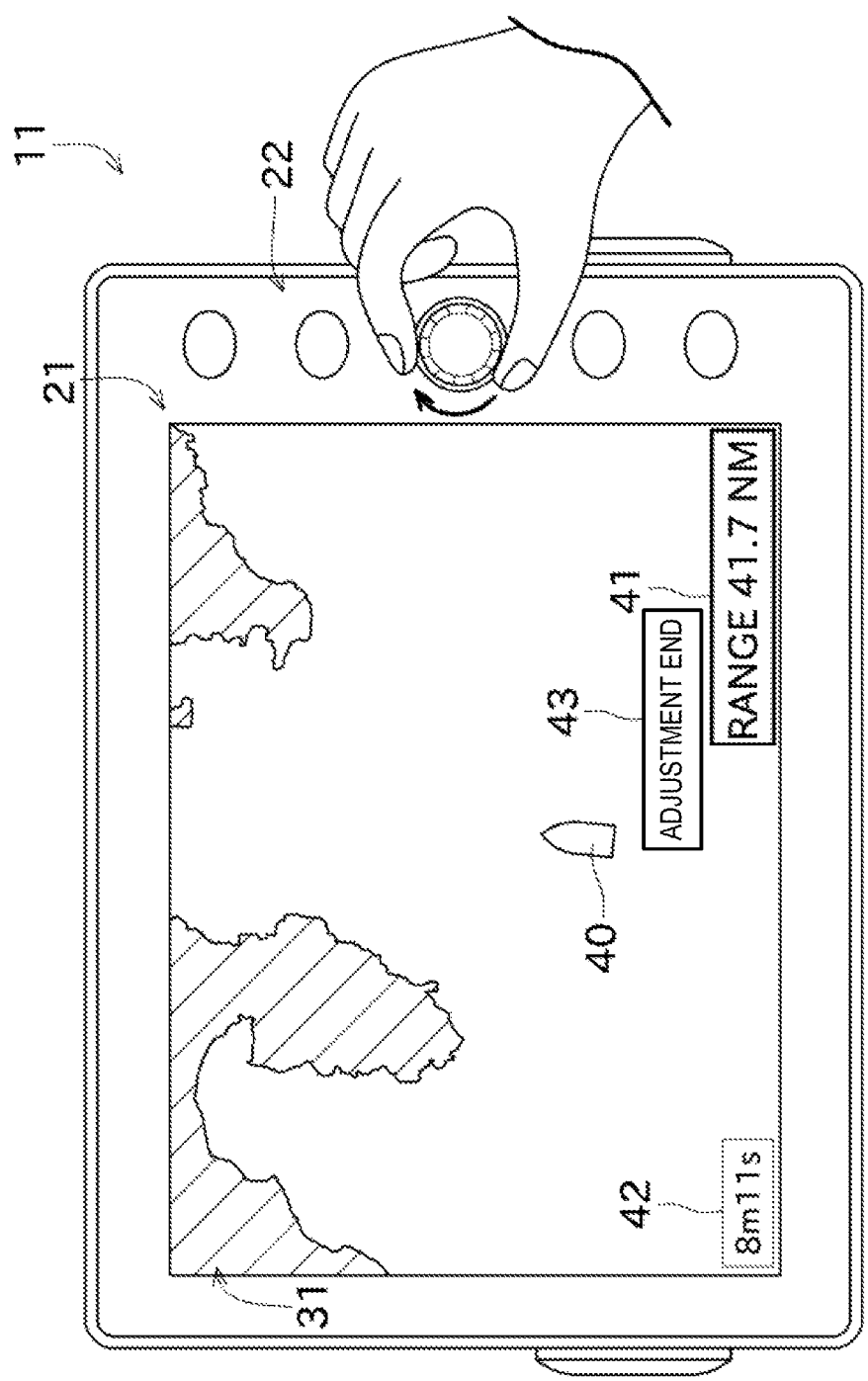
FIG. 9 is a view illustrating a state where setting-value change processing is performed when a touch operation is not detected.
Figure 10A:
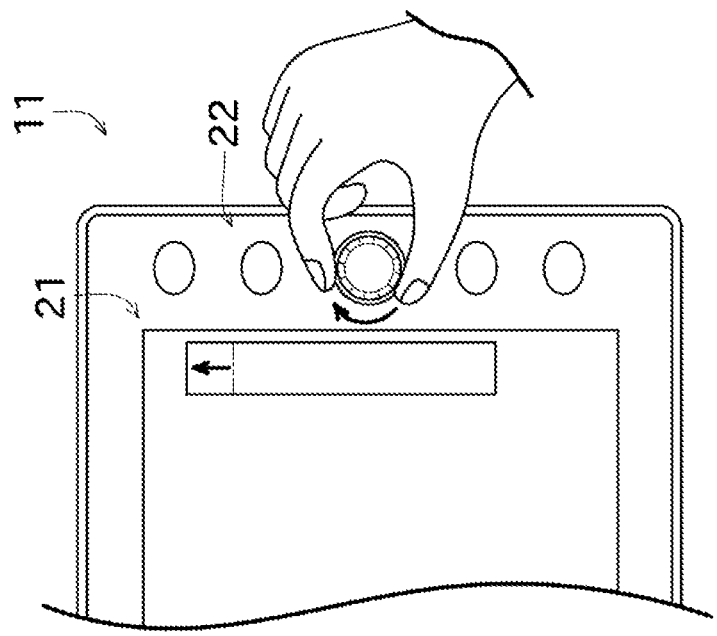
FIGS. 10(a) and 10(b) show views illustrating how a rectangular area having a fixed horizontal width is formed by the touch operation and a hardware key, respectively.
Figure 10B:
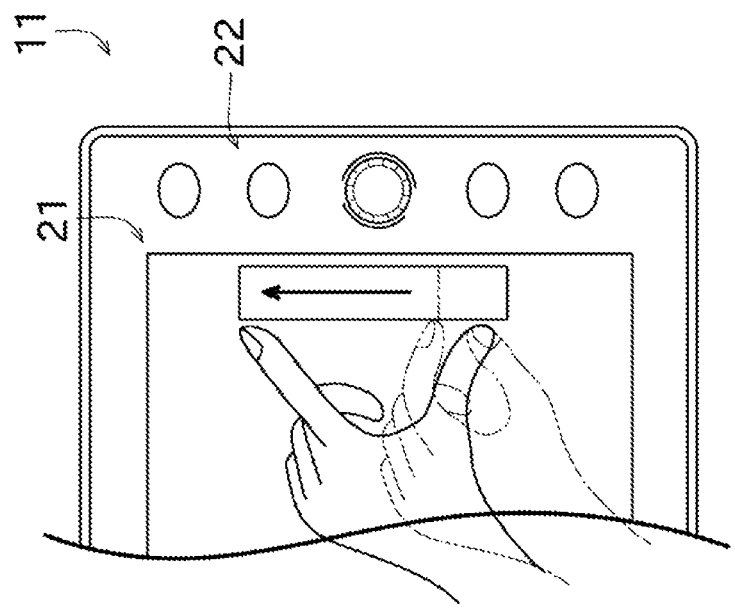

Next, a configuration different from the above embodiment is described with reference to FIGS. 9, 10(*a*) and 10(*b*). FIG. 9 is a view illustrating a state where the setting-value change processing is performed when the touch operation is not detected. FIGS. 10(*a*) and 10(*b*) show views illustrating how a rectangular area having a fixed horizontal width is formed by the touch operation and the hardware key 22, respectively.

In the above embodiment, the controller 25 is configured to accept the operation of changing the scale with the rotary key only while the touch operation on the range display box 41 or the like is detected. Instead of this configuration, for example, as illustrated in FIG. 9, the controller 25 may be configured such that the change of the scale by the hardware key 22 is accepted until a predetermined operation is performed (e.g., until an adjustment end box 43 is touched) even after a finger touches the range display box 41 and is separated from the range display box 41.

Thus, even in a situation where only one hand can be used, for example, specifying a fine value which is difficult with a touch operation can be performed while achieving the instinctive and simple operation by the touch operation. Note that, the controller 25 may be configured such as to end accepting the change of the scale when a predetermined operation is performed on the hardware key 22, instead of the adjustment end box 43.

Moreover, in the above embodiment, it is configured to only use the hardware key to adjust the scale and the like. Alternative to this, it may be configured to perform a rough adjustment of the setting value by the touch operation and then a fine adjustment of the setting value by the hardware key 22. To describe specifically, in a case of creating the rectangular area having the fixed horizontal width, first, the operator specifies roughly the size of the rectangular area by the pinch out operation (see FIG. 10). Then, the operator performs the fine adjustment of the rectangular area by operating the hardware key 22 (see FIG. 10(*b*)).

Although the preferred embodiments of the present invention are described above, the above configurations may be modified as follows, for example.

The setting-value change processing is not limited to the processing described above. For example, the method of the present invention can be used to change a guard zone (an area where the notification to the operator is performed when the echo is detected) in a radar image.

In the above embodiments, it is configured such that an object of which the setting value is changed is selected by the touch operation on the touch panel device 11, and the setting value is changed by the hardware key being operated; however, it may be configured such that the setting value can be changed by, not only the hardware key, but also the touch operation on the touch panel device 11. For example, it may be configured such that a slide bar (a bar-shaped graphic which can be slid by the touch operation) is displayed in the touch panel device 11, and the setting value is changed by the touch operation on the slide bar.

In the above embodiments, as the processing of changing the display mode of the image, the processing of enlarging (changing the scale of) one of the two divided screens is described; however, the change of the display mode of the image is not limited to the change of the scale. For example, the processing may be such that the image is rotated centering on the touched position (reference position). Moreover, the processing of changing the display mode of the image is not limited to be performed during the divided screen mode, but may also be performed in the full screen mode.

The setting value is limited to be displayed in the rectangular area such as the range display box 41. For example, the setting value of the range or the like can be displayed inside an area shaped as a polygon, a circle or the like, other than the rectangle.

The hardware key to be operated to change the scale and the like is not limited to the rotary key, and may also be a cursor key, a ten key or the like.

The method of changing the display mode of the touched object is not limited to the configuration described above (the configuration of thickening the frame). For example, it may be a configuration of a highlight display, changing the color or the shape, or displaying, near the object, a mark indicating that the object is touched.

The touch panel device may be, other than the display device to be installed in ships, a display device (e.g., navigation device) to be installed in movable bodies, such as automobiles and aircrafts, a tablet PC, a smart phone, a handheld terminal, and the like.

DESCRIPTION OF REFERENCE NUMERAL(S)

1 Ship Instrument Network System
10 Ship Network
11 Touch Panel Device (Device having Touch Panel)
12 GPS Antenna (GNSS Sensor)
13 Radar Antenna
14 Fish Finder
15 Heading Sensor
16 Autopilot Device
21 Display Unit
22 Hardware Key
23 Memory
24 Detector
25 Controller

What is claimed is:
1. A device having a touch panel, comprising:
a hardware key;
a display unit configured to display at least an image and an alarm section on a display screen;
a detector configured to detect a position of a touch operation performed on the display screen; and
a controller configured to perform a setting-value change processing of changing a setting value of an object displayed at the touched position, when a hardware key operation is performed while the touch operation on the display screen is detected, wherein the controller is configured to perform setting-value change processing by zooming the image, centering on the touched position, and is also configured to perform setting-value change processing by rotating the image, centering on the touched position, according to the input of the user;

the display unit only displays the alarm section when an alarm function is determined to be valid by the device;

the hardware key operation adjusts the setting-value change processing; and the hardware key is physically connected to the device having the touch panel.

2. The device having the touch panel of claim 1, wherein after the detector no longer detects the touch operation on the display screen, the controller does not perform the setting-value change processing even when the hardware key is operated.

3. The device having the touch panel of claim 1, wherein the controller changes a display mode of the object displayed at the touched position.

4. The device having the touch panel of claim 1, wherein the display unit displays a setting-value display box where the setting value is displayed, and wherein when the hardware key is operated while the touch operation on the setting-value display box is detected, the controller changes the setting value according to the operation of the hardware key.

5. The device having the touch panel of claim 1, wherein the display unit displays a predetermined area indicating a predetermined range, and wherein when the hardware key is operated while the touch operation on the predetermined area is detected, the controller changes the predetermined area according to the operation of the hardware key.

6. The device having the touch panel of claim 1, wherein the display unit is able to display information in a divided screen mode in which the display screen is divided and different information is displayed in the respective divided screens, and wherein when the hardware key is operated while the touch operation on any of the divided screens is detected, the controller performs the setting-value change processing only on the touched divided screen.

7. The device having the touch panel of claim 1, wherein the setting-value change processing is processing of changing a display mode of the image by having the touched position as a reference position.

8. The device having the touch panel of claim 7, wherein the setting-value change processing includes zooming-in or zooming-out the image by having the touched position as a reference position.

9. The device having the touch panel of claim 1, wherein the device is to be installed in a ship, and wherein information acquired from ship instrument is displayed in the display unit.

10. A display control program executed on a device, the device including a hardware key, a display unit with a display screen, a controller, and a detector operatively coupled to the display unit, wherein the controller is operatively coupled to the hardware key and detector, and the display control program is executed on the device to:

display at least an image and an alarm section on the display screen;

detect a position of a touch operation performed on the display screen; and perform setting-value change processing of changing a setting value of an object displayed at the touched position, when a hardware key operation is performed while the touch operation on the display screen is detected, and perform setting-value change processing by zooming the image, centering on the touched position, and perform setting-value change processing by rotating the image, centering on the touched position, according to the input of the user, wherein the alarm section is only displayed when an alarm function is determined to be valid by the device;

the hardware key operation adjusts the setting-value change processing; and the hardware key is physically connected to the device including the display unit.

11. A display control method for a device comprising a hardware key, a display unit with a display screen, a detector operatively coupled to the display unit, and a controller operatively coupled to the hardware key and detector, the method comprising:

displaying at least an image and an alarm section on the display screen;

detecting a position of a touch operation performed on the display screen;

performing setting-value change processing of changing a setting value of an object displayed at the touched position, when a hardware key operation is performed while the touch operation on the display screen is detected, and performing setting-value change processing by zooming the image, centering on the touched position, and performing setting-value change processing by rotating the image, centering on the touched position, according to the input of the user, wherein the alarm section is only displayed when an alarm function is determined to be valid by the device;

the hardware key operation adjusts the setting-value change processing; and the hardware key is physically connected to the device comprising the display unit.

\* \* \* \* \*